United States Patent [19]

Hayakawa et al.

[11] Patent Number: 5,550,938
[45] Date of Patent: Aug. 27, 1996

[54] CORDLESS IMAGE SCANNER

[75] Inventors: Tomohiko Hayakawa, Kyoto; Toshihiro Tashima, Joyo, both of Japan

[73] Assignee: Omron Corporation, Kyoto, Japan

[21] Appl. No.: 170,918

[22] Filed: Dec. 21, 1993

Related U.S. Application Data

[63] Continuation-in-part of Ser. No. 803,733, Dec. 9, 1991, abandoned.

[30] Foreign Application Priority Data

Apr. 17, 1989 [JP] Japan .................................. 1-96962

[51] Int. Cl.⁶ .................................................. G06K 9/22
[52] U.S. Cl. ..................... 382/313; 382/321; 358/473
[58] Field of Search ............................. 358/473; 382/59, 382/61, 65, 67, 313, 314, 315, 317, 321, 323, 189; 364/708.1, 709.11

[56] References Cited

U.S. PATENT DOCUMENTS

| | | | |
|---|---|---|---|
| 4,523,235 | 6/1985 | Rajchman | 382/59 |
| 4,701,804 | 10/1987 | Toyoda et al. | 382/59 |
| 4,730,364 | 3/1988 | Tat-Kee | 361/380 |
| 4,870,458 | 9/1989 | Shibuya et al. | 340/712 |
| 4,887,165 | 12/1989 | Sato et al. | 382/59 |
| 4,922,111 | 5/1990 | Kuwano et al. | 382/59 |
| 4,937,762 | 1/1990 | Todome | 340/712 |

FOREIGN PATENT DOCUMENTS 0218178 10/1985 Japan .......................... G06K 9/22

*Primary Examiner*—Leo Boudreau
*Assistant Examiner*—Phuoc Tran
*Attorney, Agent, or Firm*—Dickstein, Shapiro & Morin

[57] ABSTRACT

An image scanner comprises an image sensor for inputting image data, a rotary encoder, LED and read out window for reading image data, a buffer D RAM, ROM and S RAM for storing image data, a LCD display for displaying input image data, a power source for supplying electrical power, and a memory card for communicating stored image data to a host, wherein the above elements are formed as a cordless, card-shaped unit.

15 Claims, 9 Drawing Sheets

CORDLESS IMAGE SCANNER

This application is a continuation-in-part of application Ser. No. 07/803,733, filed Dec. 9, 1991, now abandoned.

BACKGROUND

1. Field of the Invention

This invention is related to an image scanner. More specifically, this invention relates to a cordless image scanner used for reading handwritten pictures or drawings.

2. Related Art

FIGS. 5–7 illustrate a conventional image scanner 50. An image sensor 51 can read handwritten pictures or drawings. A binary means, which may be a half tone processor circuit 56, converts the analog data accumulated by the image sensor 51 and transmits the converted data to a CPU 52. The CPU 52 processes the data read by the image sensor 51 and then sends such data to a personal computer or a word processor, either of which constitutes a host computer 60. The transmitted data is stored in the memory of the host 60 and displayed on its display screen 60a.

A LED array 53 is used as a light source and emits light onto the surface of a script to illuminate an image. A rotary encoder 54 defines the scope of image inputting by regulating the scope of the imaged picture. Controller or PIA (peripheral interface adapter) circuit 55 controls the LED 53 and the rotary encoder 54 and monitors the ratio of distance covered with respect to the light flashes emitted by the LED 53. A start switch 57 is turned on when it is desired to image data. A zoom switch 58 allows the image scanner 50. Finally, a programmed ROM 63 is used for compressing system data.

In FIG. 6, the image scanner 50 is linked to interface B by cable 61 and is detachably connected to the host computer 60 via the interface B. On the other hand, in FIG. 7, information is supplied through a cable 61 and a standard interface RS232C. In the conventional image scanner 50, not only the display of stored image data but also the power supply are dependent upon host computer 60. It is impossible to use the image scanner 50 by itself; the use of the image scanner 50 is limited to places providing a host computer 60. Subsequently, handwritten drawings or pictures cannot be freely input everywhere.

Another drawback with the conventional image scanner 50 stems from the cable 61 which connects the host 60 to the image scanner 50. When an operator inputs images from a script, for example, 100 images, the operator must grasp the image scanner 50 in his hand and slidably move the image scanner 50 across the script for each image. This movement is not only hindered by the tension in the cable 61 but also such hindrance may induce distortion in the images produced.

SUMMARY OF THE INVENTION

In view of the above-mentioned problems, a primary object of this invention is to provide an image scanner that is operable anywhere; an image scanner that is not limited by place, i.e. a place that has a host computer.

Another object of this invention is to provide a cordless image scanner. By providing such a cordless image scanner, not only operation but also the function of data processing can be improved as the problems resulting from inconsistent scanner movement caused by a tensioned cable will be eliminated.

Yet another object of this invention is to provide a portable image scanner. A portable image scanner would increase the desirability of an image scanner because of added convenience to an operator. For example, a large image scanner would not be very convenient to carry around even if it was capable of operating anywhere without being hooked up to a host computer. Accordingly, the image scanner according to this invention has a card-shaped construction that is both small and lightweight.

In order to realize these foregoing objects, the image scanner according to an embodiment of this invention comprises a data reading circuit for reading image data input through a sensor, a displaying unit for displaying image data input through the data reading circuit, an input operating circuit for controlling the image data input though the sensor, a communication transfer unit for transferring the read image data to an external host as well as for inputting data from the host, a data storing unit for storing image data input through the data reading unit, and a power source for supplying the power necessary for operation of the above apparatus, which is formed as a single card-shaped unit.

Other objects and advantages of this invention will become apparent from the following description and accompanying drawings.

BRIEF DESCRIPTION OF THE DRAWINGS

FIG. 8 is a block diagram of the operation of an image scanner according to a second embodiment of this invention.

FIG. 9(a)–(d) are block diagrams of operation of an image scanner according to the second embodiment of this invention.

DESCRIPTION OF THE PREFERRED EMBODIMENTS

Figure 2A:
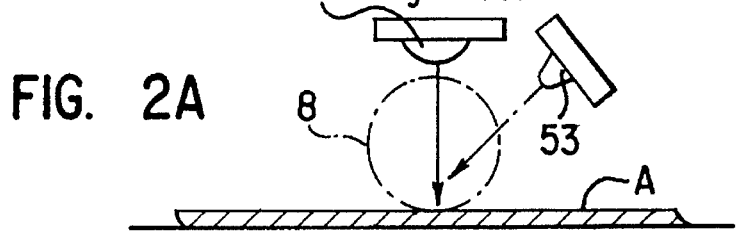
FIG. 2(a) illustrates the manner in which data is imaged in an embodiment of this invention.
Figure 2B:
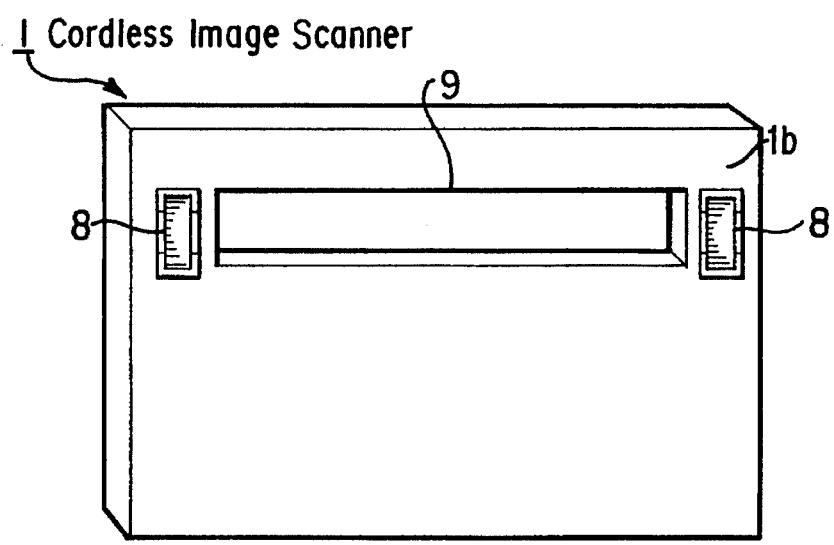
FIG. 2(b) is a bottom view of the image scanner of this invention.
Figure 3:
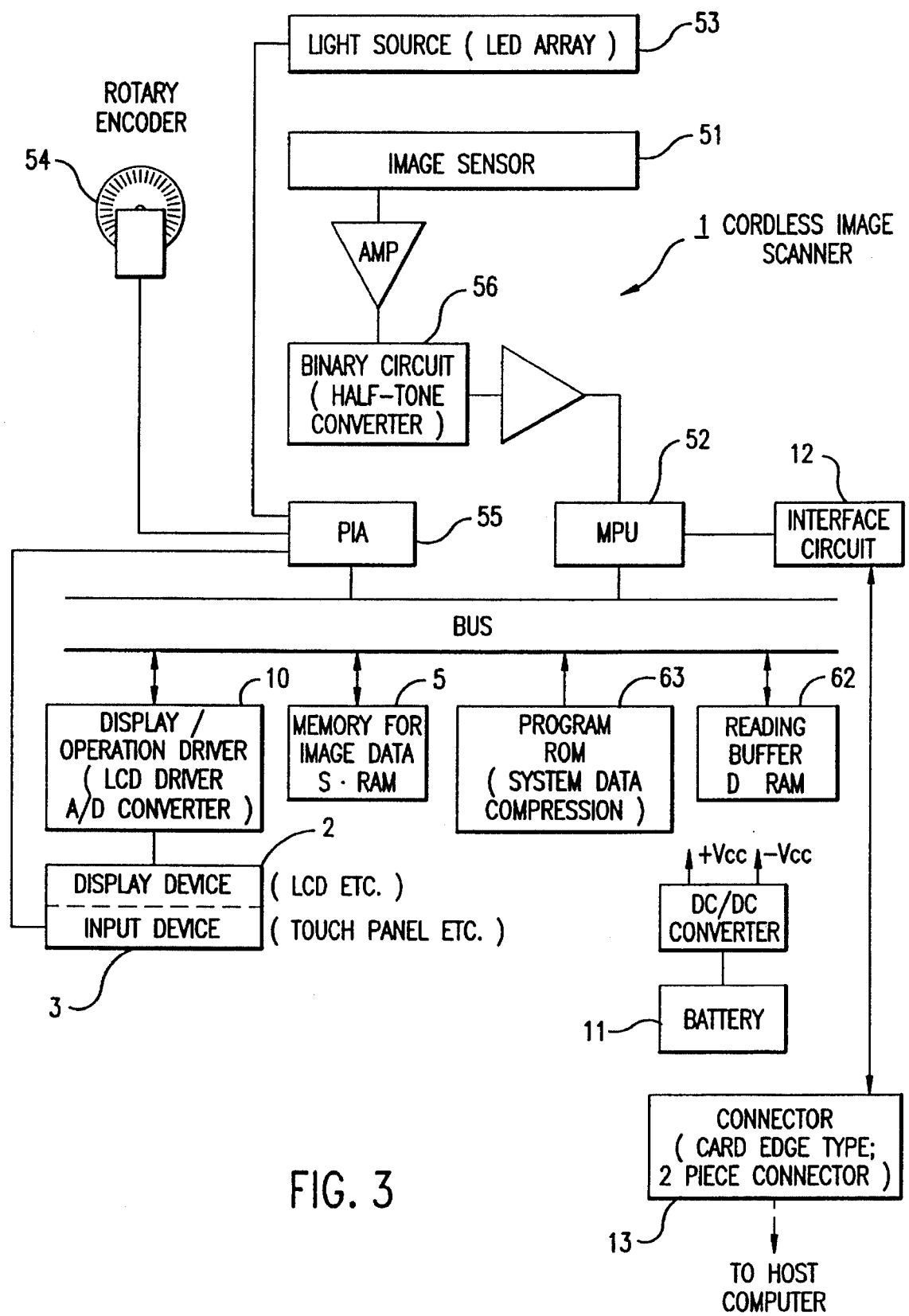
FIG. 3 is a block diagram of an image scanner according to an embodiment of this invention.
Figure 4:
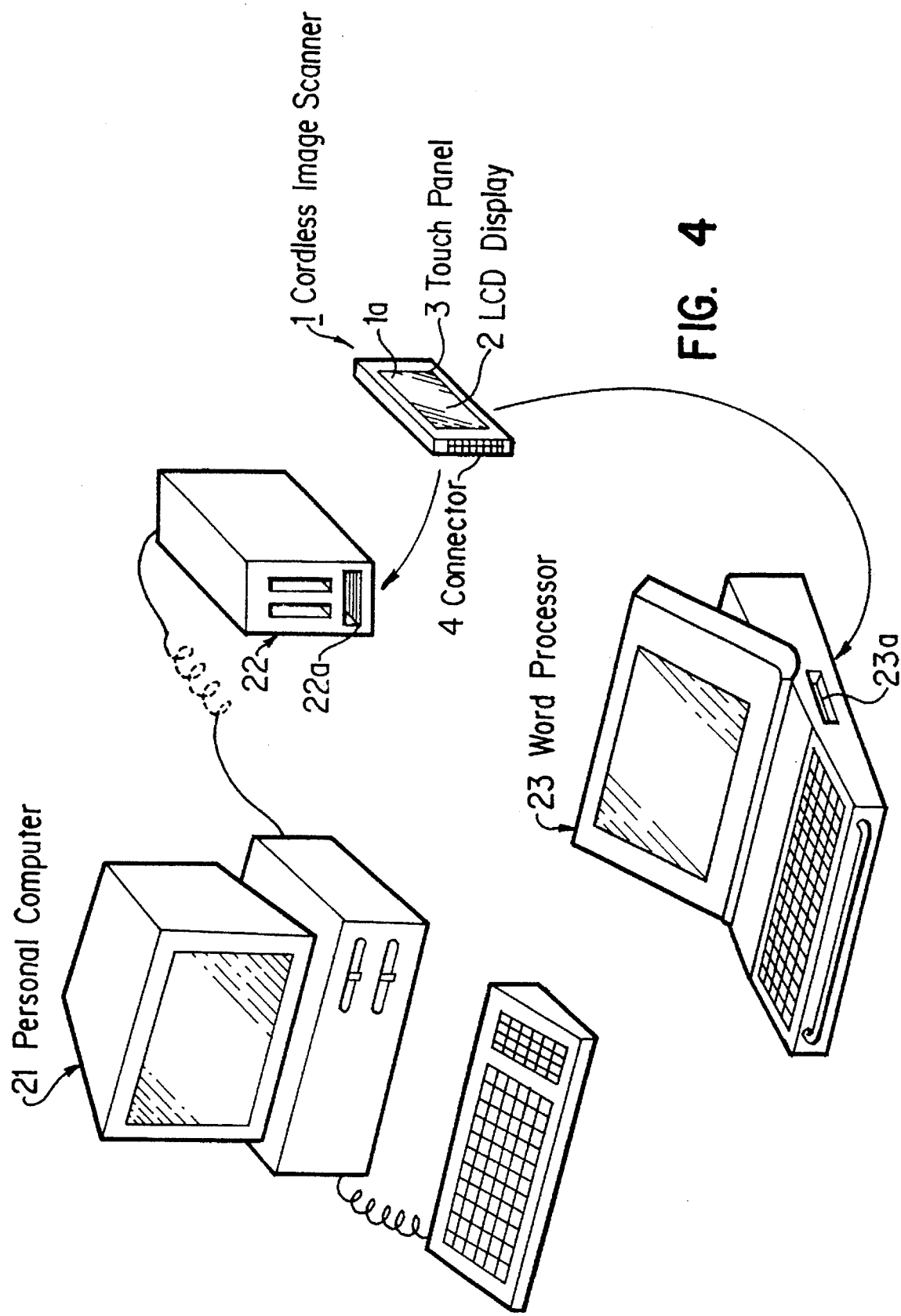
FIG. 4 is a perspective view illustrating the manner in w which data can be communicated from the image scanner of this invention to a host.
Figure 5:
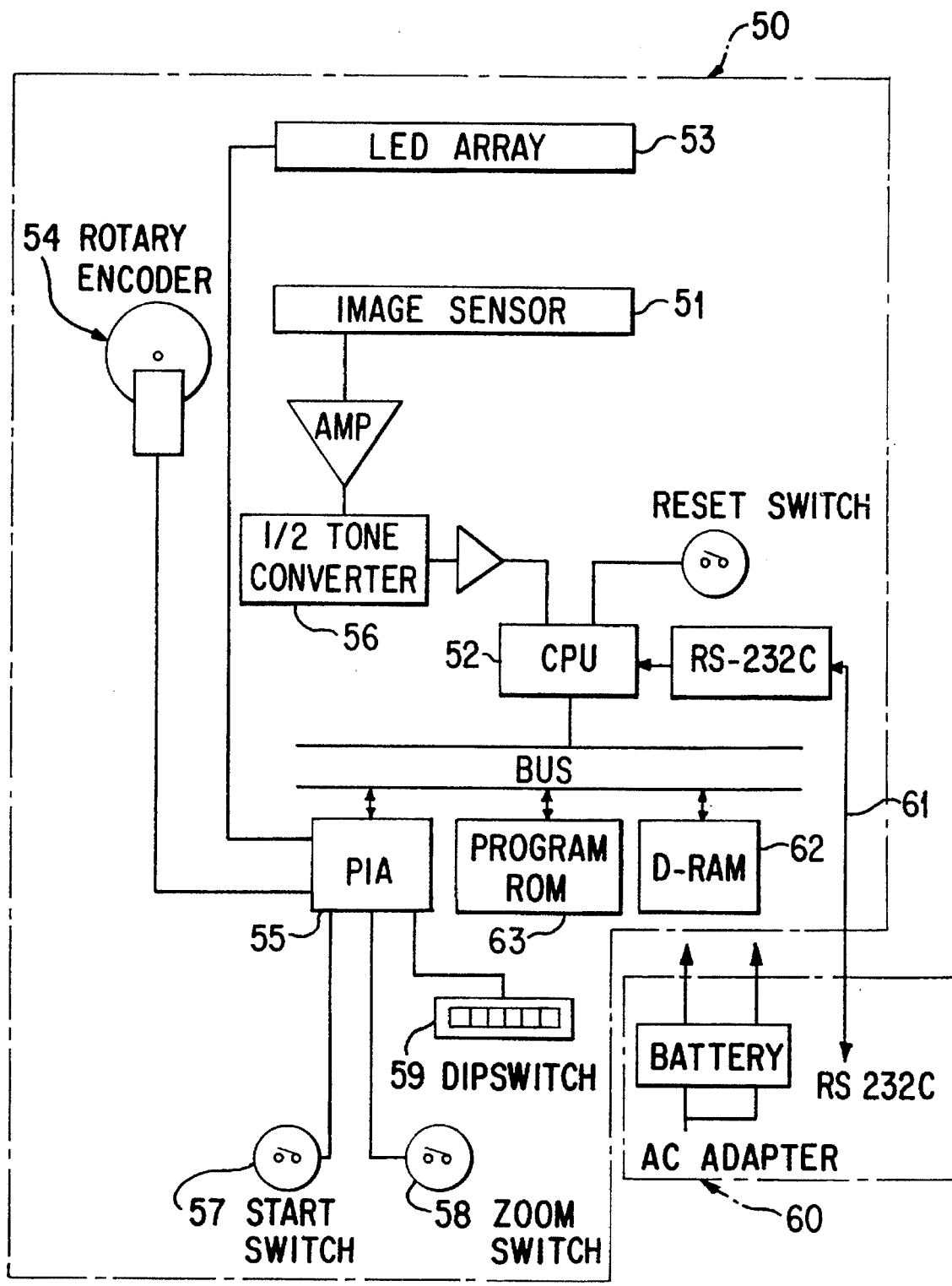
FIG. 5 is a block diagram of a conventional image scanner.
Figure 6:
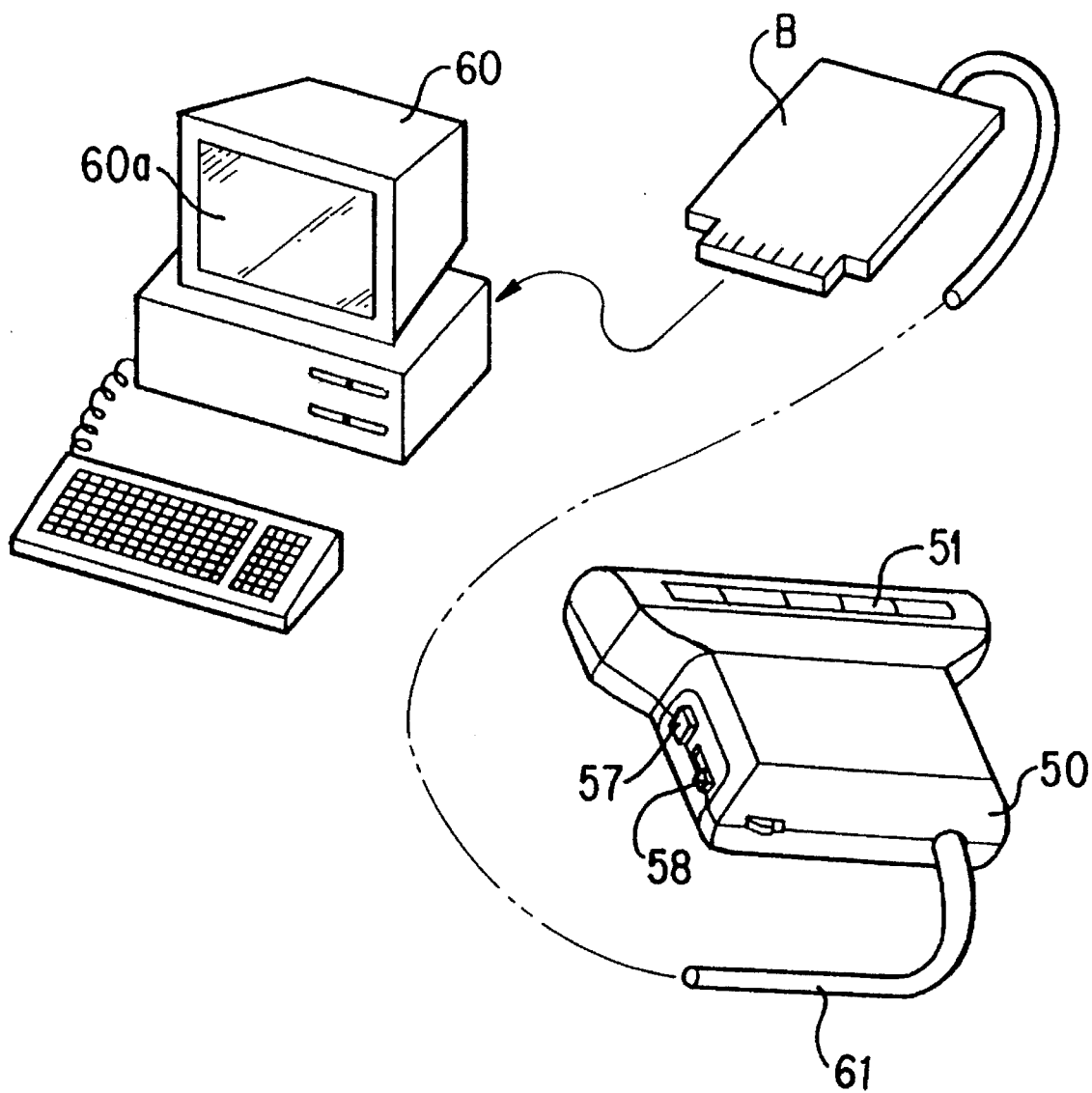
FIG. 6 shows a manner in which data is communicated to a host from a conventional image scanner.
Figure 7:
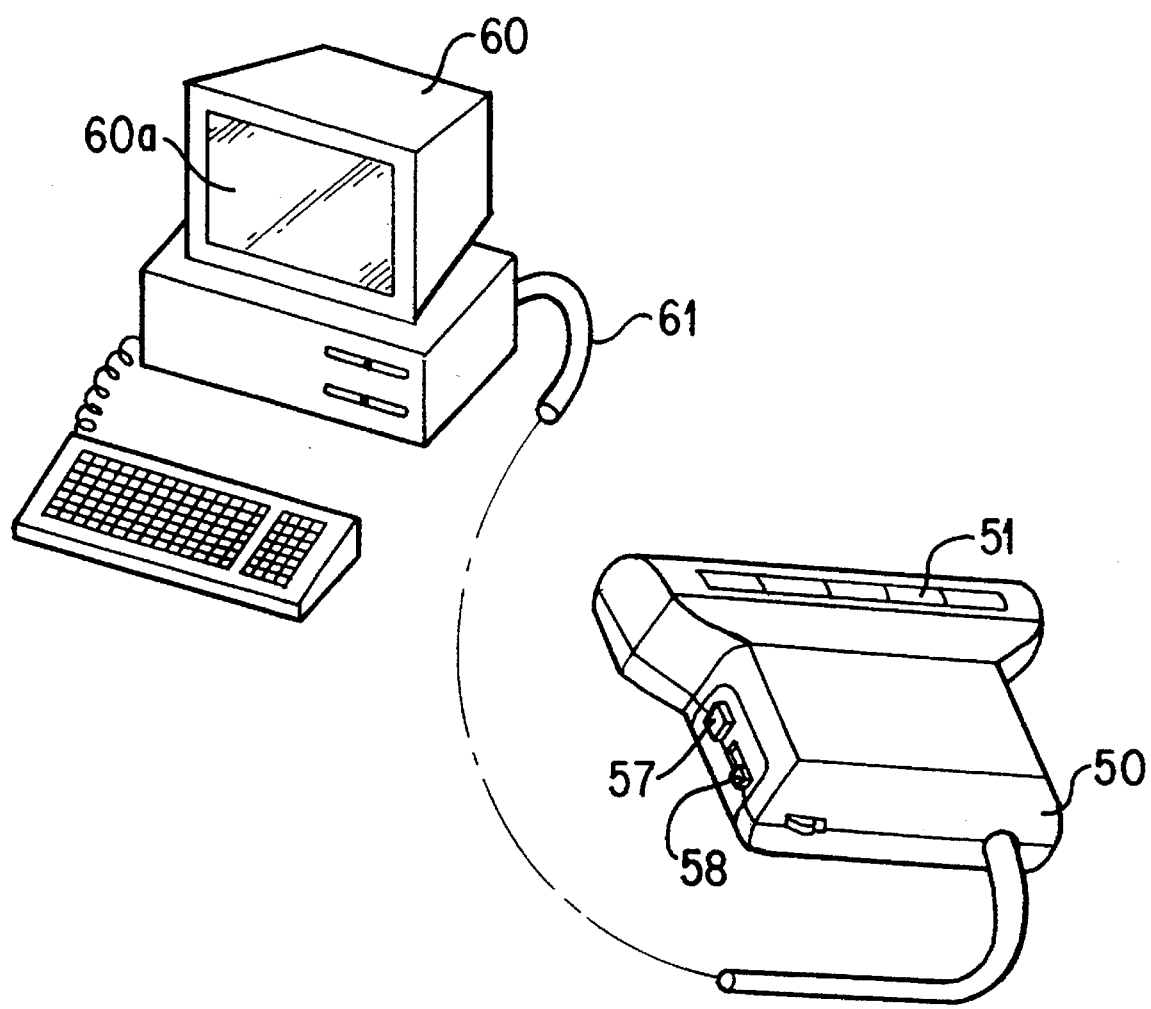
FIG. 7 shows another manner in which data is communicated to a host from a conventional image scanner.

FIGS. 1–4 illustrate an embodiment of an image scanner according to this invention. The same parts have the same numbers as in the conventional drawings, FIGS. 5–7. Thus, an image scanner 1 of this invention has an image sensor 51. An image data inputting means inputs reads image data from a script A bearing needed pictures or drawings. A DRAM (dynamic RAM) 62 serves as a reading buffer for reading input image data. A CPU 52 controls the various parts and processes information. An LCD 2 displays images scanned. A touch panel 3 is provided for changing function modes. A connector portion 4 can be a card edge type connector or a two piece type connector and is used for data communication and transmission. Thus, image data can be communicated to a host without using a cord. Additionally, the connector portion 4 also enables the image scanner 1 to be used as a memory card capable of communicating information from one host to another or to be used as an extra memory for a host. A SRAM (static RAM) 5 stores image data after the data is processed by the CPU 52 and before the data is transmitted to a host. Finally, a paper battery 11 is used as a power source. Consequently, the paper battery 11 in combination with the connector portion 4 enable the construction of a self-contained cordless apparatus. And, as can be seen in FIG. 4, the apparatus is thin and, due to the paper battery 11, portable.

Figure 1:
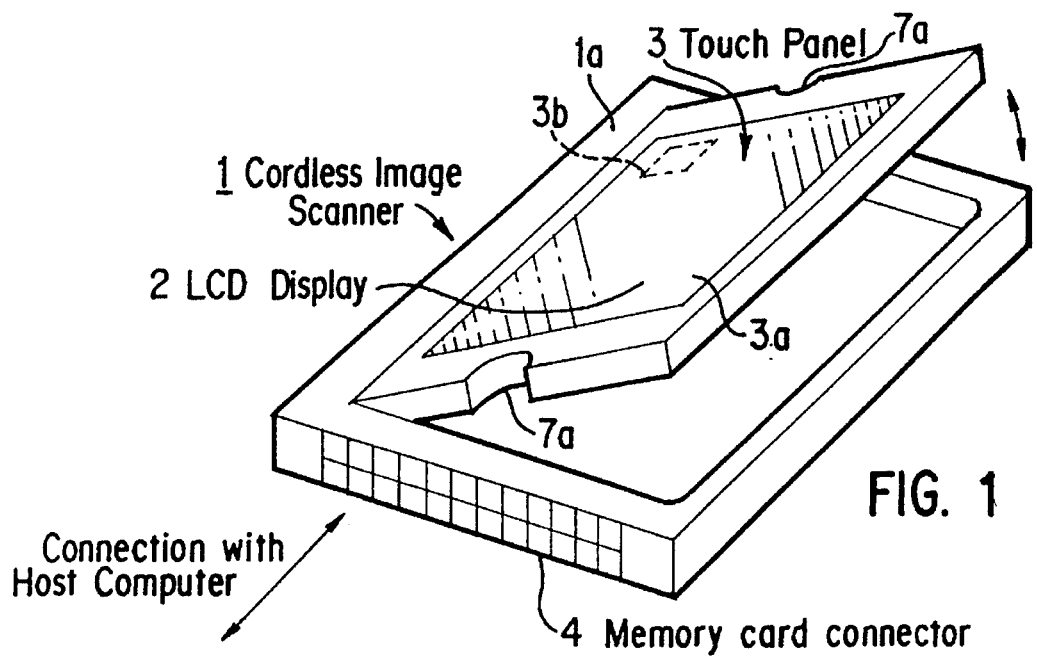
FIG. 1 is a perspective view of a cordless image scanner according to an embodiment of this invention.

As demonstrated by the arrows in FIG. 1, the touch panel 3 has a construction that enables it to be stood up in the direction of the upper front side 1a. Furthermore, the touch panel 3 has handles 7a for easy lifting. An array of transparent electrodes 3a are provided as a touch panel 3 input means and are located on the outer portion of LCD 2. For example, if the operator depresses switch portion 3b on the touch panel 3a, then the function mode is changed and image data input from the image sensor 51 is displayed on the LCD 2.

As shown in FIGS. 2(a) and 2(b), encoder rollers 8 which are used for detecting distance are located on both sides of a read out window 9 on the backside 1b of the image scanner 1. By moving the encoder rollers 8 along the script A bearing pictures or drawings while illuminating the image with light emitted from the light source 53, image data can be input through the read out window 9 to the image sensor 51.

The source of power and means of communicating stored image data to a host can be seen in FIG. 3. A driver circuit 10 is used for display and operation while the paper battery 11 is used as the power supply. An interface circuit 12 is used for data transmission. A connector 13 can be a card edged type or a two piece type and is disposed in the connector portion 4.

FIG. 4 shows an embodiment of this image scanner 1. The image scanner 1 is either inserted into the card insertion portion 22a of disc driver 22 of a personal computer 21 or it is inserted into a card insertion portion 23a of a word processor 23. This action initiates data communication and the image data of script A is displayed on the screen of either the personal computer 21 or word processor 23. Consequently, it is possible to modify the displayed image data and store such data in the memory of the personal computer 21 or word processor 23 as well as in the SRAM 5 of the image scanner 1. Furthermore, the image scanner 1 can be used alone and only linked to a host when data is desired to be transferred.

Now describing an operation of recording a picture or drawing with the image scanner 1, an operator first stands up the touch panel 3 by grasping the handle portions 7a. Next, the operator presses switch portion 3b to enable viewing of the image data to be recorded. To record the data, the operator slides the encoder rollers 8 over the script A. The image sensor 51 records image data through the read out window 9 and sends the data to be temporarily stored in the DRAM 62, which acts as a buffer memory while the CPU 52 processes the information. The processed data is then transmitted through the busline where the programmed ROM 63 compresses such data to enable storing in the SRAM 5.

As shown in FIG. 4, when the operator wants to transmit the recorded data to a host, like the personal computer 21 or the word processor 23, connector portion 4 of the image scanner 1 is inserted into the card insertion portion 21a or 23a respectively. Thus, information can be conveniently recorded at any time and communicated to a host only when necessary.

Figure 9A:
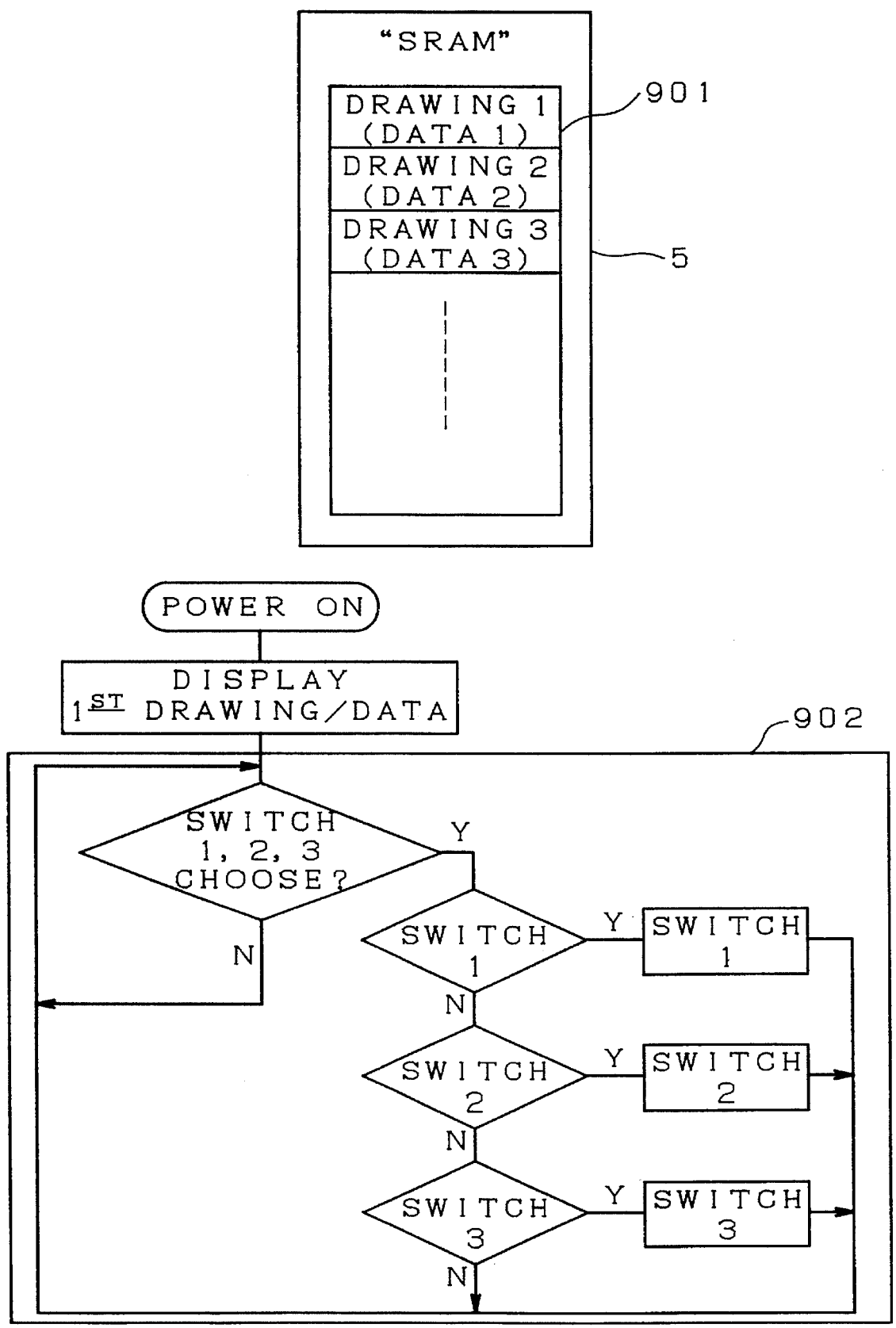
Figure 10:
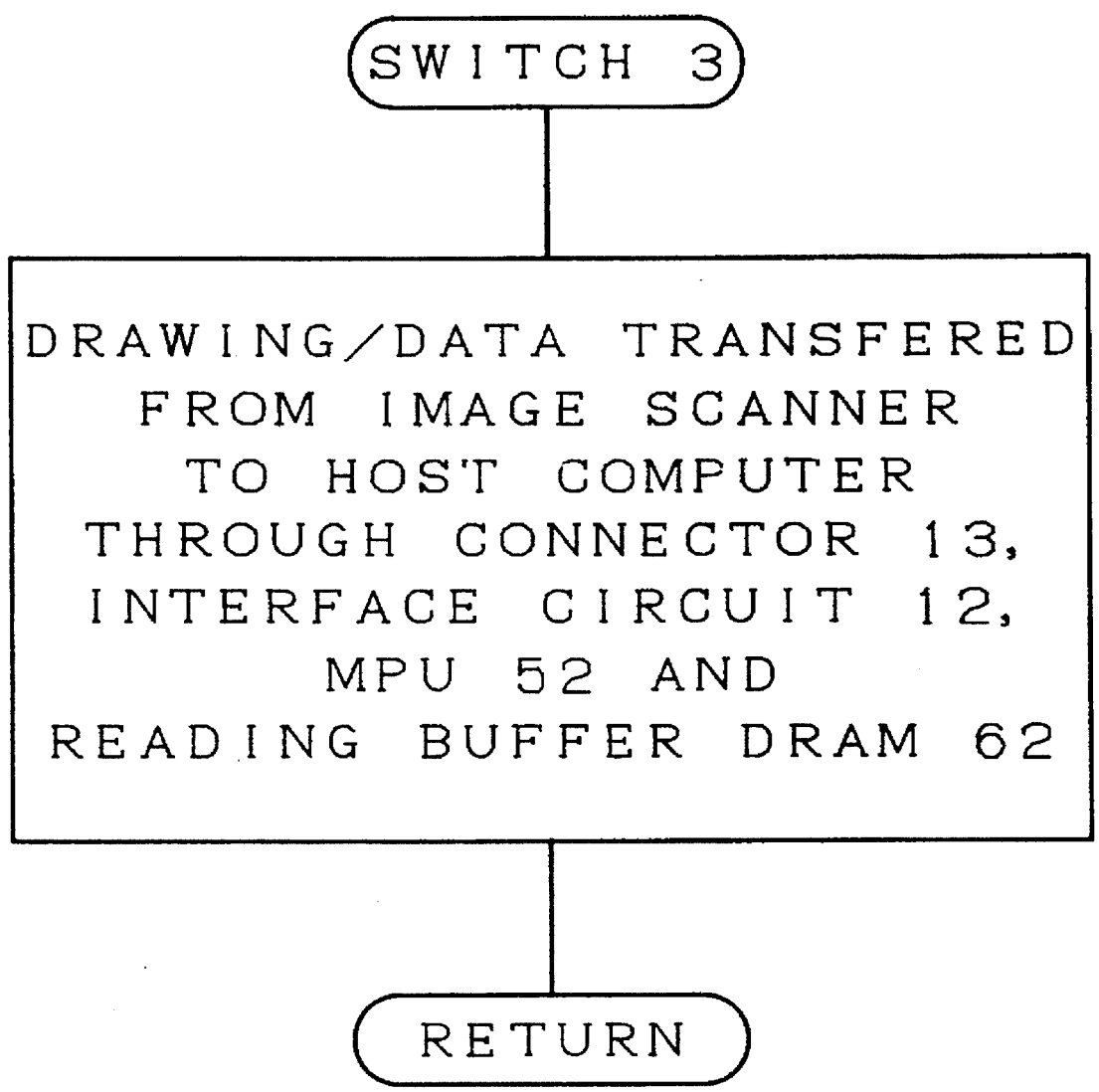
FIG. 10 is a block diagram of a memory for an image scanner according to an embodiment of this invention.
Figure 11:
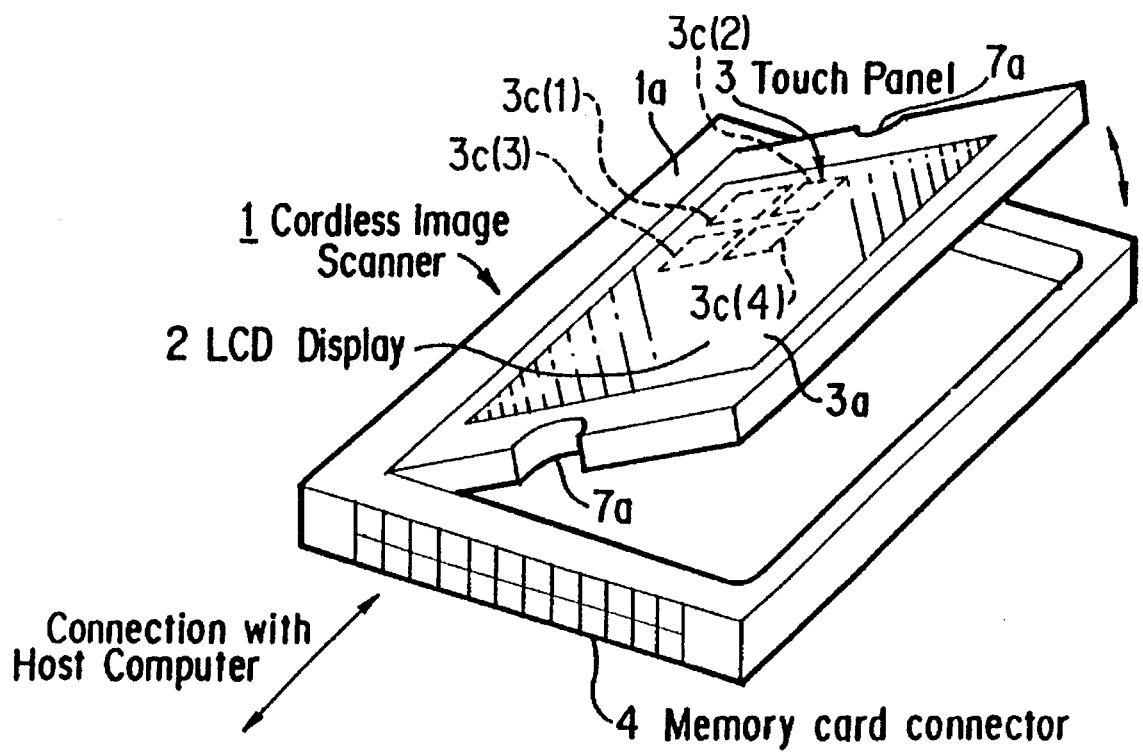
FIG. 11 is a perspective view of a cordless image scanner according to a second embodiment of this invention.

FIGS. 8–11 illustrate a second embodiment of the image scanner according to the present invention. In this embodiment, as shown in FIG. 11, the touch panel 3 contains four switches 3c(1), 3c(2), 3c(3), 3c(4), each configured like switch 3b of FIG. 1. The four switches 3c(1), 3c(2), 3c(3), 3c(4) change between modes of operation of the scanner as further explained below. The elements of the image scanner shown in FIG. 3 are also part of the second embodiment. Only a different program is stored in the program ROM 63 to permit operation of the scanner in different modes, as discussed below. In the second embodiment, as shown in FIG. 10, the SRAM 5 stores image data 901 corresponding to a plurality of drawings. Image data for any of the plurality of drawings can be inputted, displayed and transferred to the host computer 21.

FIG. 8 illustrates the various modes of operation of the image scanner with respect to the setting of the four switches 3c(1), 3c(2), 3c(3), 3c(4). The scanner can display stored data at step 801, read new image data at step 802, save the displayed image data in the SRAM 5 at step 804, and communicate the image data to the host computer at step 803. FIGS. 9(a)–(d) illustrate the operation of the image scanner in each of its four modes of operation. As shown in FIG. 9(a), when the power is turned on, the first drawing is displayed. The program waits until a switch is chosen at step 902.

Each time switch 3c(2) is depressed, as shown in FIG. 9(c), the image scanner cycles through the image data stored in the SRAM 5 and displays the image data for the next drawing. The stored image data is transferred to the reading buffer 62, from which it is displayed on the display device 2.

When switch 3d(1) is depressed, as shown in FIG. 9(b), the reading buffer 62 is cleared. Image data is inputted into the scanner by passing the encoder rollers 8 over the script A, as in the first embodiment. The image data is sent to the reading buffer 62 and displayed. Once the read image data is stored in the reading buffer 62, it can be transferred to the SRAM 5 by pressing switch 3c(4). If switch 3c(4) is not pressed within a predetermined time, the image scanner returns to the main loop 902 and displays the image data corresponding to the first drawing 903.

When switch 3c(3) is pressed, as shown in FIG. 9(d), the drawing data currently stored in the reading buffer 62 is transferred to the host computer 21 through the MPU 52, the interface circuit 12 and the connector 13. Control then returns to the main loop 902.

In this manner, a plurality of drawings can be scanned and stored in the image scanner before being transferred to the host computer. The image data can be displayed and reviewed to select whether to store a particular scanned image and whether to transfer a stored image to the host computer.

The above descriptions and accompanying drawings are merely illustrative of the applications of the principles of the present invention and are not limiting. Many other embodiment falling under the spirit and scope of this invention may be devised by those skilled in the art. Accordingly, this invention is only limited by the scope of the appended claims.

What is claimed is:

1. A cordless hand-held image scanner comprising:

input means for inputting image data;

reading means for enabling said input means to input image data;

data storing means for storing image data input through said input means and reading means;

display means for displaying data input through said input means and for displaying, after the inputting and storing of said image data has been completed, image data stored in said data storing means;

processing means connected to said input means, reading means and display means for causing said display means to display input image data thereby enabling a user of said image scanner to correct movement of said scanner as said image data is input;

power supply means for supplying electrical power;

communication means for communicating the stored image data with a host computer; and a common card-shaped housing for supporting said input means, reading means, data storing means, display means, processing means, power supply means and communication means, said housing being user graspable and having a generally planar configuration with substantially coextensive upper and lower surfaces and side edges connecting said upper and lower surfaces, the planar area of each of said upper and lower surfaces being greater than that of said side edges, the lower surface of said housing including a read out window through which image data is input to said input means, the upper surface of said housing supporting said display means, said display means being rotatably mounted to said housing and including at least one handle for raising said display means by rotation relative to said housing from a first position where said display means forms a substantially planar upper surface of said housing to a second upstanding position.

2. An image scanner according to claim 1, wherein said reading means includes:

a pair of spaced apart axially aligned rotary encoders adjacent one end of said lower surface for rolling said image scanner across a script; and a LED for illuminating the script; and said read out window being located between said rotary encoders through which said image sensor reads image data.

3. An image scanner according to claim 1, wherein said display means is a touch panel, and wherein said display means includes handles for standing up said touch panel.

4. An image scanner according to claim 1, wherein said processing means further enables a user to see an entire image after completion of scanning.

5. An image scanner according to claim 1, wherein said communication means comprises a card edge type connector provided on one of the side edges of said housing which can be connected to the host computer.

6. An image scanner according to claim 1, further comprising control means for controlling operation of said reading means, said data storing means, said display means and said communication means.

7. An image scanner according to claim 6, wherein said control means causes said scanner to have a plurality of modes of operation, further comprising selection means for selecting one of said plurality of modes of operation, wherein said plurality of modes of operation includes at least one of displaying image data, inputting image data, storing image data, and transferring stored image data to said host computer.

8. An image scanner according to claim 7, wherein said plurality of modes of operation includes a display mode, and when said control means causes said scanner to be in said display mode of operation, said control means enables said display means to display data stored in said data storing means.

9. An image scanner according to claim 7, wherein said plurality of modes of operation includes a reading mode, and when said control means causes said scanner to be in said reading mode of operation, said control means enables said reading means and said processing means such that image data is input by said input means and displayed on said display means.

10. An image scanner according to claim 9, wherein said plurality of modes of operation includes a storing mode following said reading mode, and when said control means causes said scanner to be in said storing mode of operation, said control means enables said data storing means to store image data input through said input means and said reading means.

11. An image scanner according to claim 7, wherein said plurality of modes of operation includes a storing mode, and when said control means causes said scanner to be in said storing mode of operation, said control means enables said data storing means to store image data input through said input means and said reading means.

12. An image scanner according to claim 7, wherein said plurality of modes of operation includes a communication mode, and when said control means causes said scanner to be in said communication mode of operation, said control means enables said communication means to communicate said stored image data with said host computer.

13. An image scanner according to claim 7, wherein said data storing means stores image data for a plurality of images, and wherein said control means enables said display means to display image data corresponding to a selected one of said plurality of images.

14. An image scanner according to claim 1, wherein said data storing means stores image data for a plurality of images, and wherein said display means can display image data corresponding to a selected one of said plurality of images.

15. An image scanner according to claim 1, wherein said data storing means stores image data for a plurality of images, and wherein said communication means can communicate image data corresponding to a selected one of said plurality of images to said host computer.

* * * * *